US006702913B2

(12) United States Patent
Marchini et al.

(10) Patent No.: US 6,702,913 B2
(45) Date of Patent: Mar. 9, 2004

(54) METHOD AND APPARATUS FOR MANUFACTURING A REINFORCING STRUCTURE FOR TYRES OF VEHICLES

(75) Inventors: Maurizio Marchini, Milan (IT); Marco Cantu, Milan (IT); Ignazio De Gese, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/897,493

(22) Filed: Jul. 3, 2001

(65) Prior Publication Data

US 2002/0023705 A1 Feb. 28, 2002

Related U.S. Application Data

(63) Continuation of application No. PCT/EP00/11598, filed on Nov. 21, 2000.

(60) Provisional application No. 60/176,630, filed on Jan. 19, 2000.

(30) Foreign Application Priority Data

Nov. 26, 1999 (EP) ........................................... 99830736

(51) Int. Cl.[7] ............................................... B29D 30/16

(52) U.S. Cl. ....................... 156/117; 152/526; 152/538; 156/130; 156/130.3; 156/133; 156/265

(58) Field of Search ................................ 156/117, 397, 156/123, 133, 134, 130, 121, 130.3, 405.1, 406.4, 264–266; 152/526, 538, 562

(56) References Cited

U.S. PATENT DOCUMENTS

| | | | | |
|---|---|---|---|---|
| 1,728,957 A | | 9/1929 | Dickinson | |
| 5,281,289 A | * | 1/1994 | Debroche et al. | 156/117 |
| 5,395,476 A | * | 3/1995 | Debroche et al. | 156/397 |

FOREIGN PATENT DOCUMENTS

| | | |
|---|---|---|
| EP | 0 956 940 A1 | 11/1999 |
| GB | 24956 | 3/1910 |
| GB | 848962 | 9/1960 |

* cited by examiner

*Primary Examiner*—Geoffrey L. Knable
(74) *Attorney, Agent, or Firm*—Finnegan, Henderson, Farabow, Garrett, & Dunner, L.L.P.

(57) ABSTRACT

A method for manufacturing a reinforcing structure for tyres of vehicles includes the steps of preparing a plurality of strip segments having substantially parallel, longitudinal filiform elements at least partially coated by at least one layer of elastomeric material, and applying the plurality of strip segments along a circumference of a toroidal support, to form at least one continuous reinforcing layer about a geometric axis of rotation of the toroidal support. During the applying step, a relative angular rotation, between at least one of the plurality of strip segments and the toroidal support, occurs about an axis of correction substantially radial to the geometric axis of rotation. A related apparatus for manufacturing a reinforcing structure for tyres of vehicles is also disclosed.

14 Claims, 3 Drawing Sheets

3
2
5
5
5
X
X
Y–Y
15
α
α'
3a

METHOD AND APPARATUS FOR MANUFACTURING A REINFORCING STRUCTURE FOR TYRES OF VEHICLES

CROSS-REFERENCES TO RELATED APPLICATIONS

This application is a continuation of International Patent Application No. PCT/EP00/11598, filed Nov. 21, 2000, in the European Patent Office; additionally Applicants claim the right of priority under 35 U.S.C. §119(a)–(d) based on patent application No. 99830736.7, filed Nov. 26, 1999, in the European Patent Office; further, Applicants claim the benefit under 35 U.S.C §119(e) based on prior-filed, copending provisional application No. 60,176,630, filed Jan. 19, 2000, in the U.S. Patent and Trademark Office; the contents of all of which are relied upon and incorporated herein by reference.

BACKGROUND OF THE INVENTION

1. Field of the Invention

The present invention relates to a method for manufacturing a reinforcing structure for tires of vehicles, comprising the following steps: preparing strip-like segments each comprising longitudinal filiform elements arranged mutually parallel at least partially coated by at least a layer of elastomeric material; applying the strip-like segments in mutually approached relationship along the circumferential development of the toroidal support, to form at least a reinforcing layer having continuous circumferential development about a geometric axis of rotation.

The invention further relates to an apparatus for implementing the aforementioned method, said apparatus being of the type comprising: a unit for the feeding of strip-like segments arranged mutually parallel at least partially coated by at least a layer of elastomeric material; a laying unit for applying each of said strip-like segments onto a toroidal support, according to a pre-set laying angle relative to a direction of circumferential development of the toroidal support itself, first angular actuation devices to determine a relative motion between the laying unit and the toroidal support, about a geometric axis of the toroidal support itself.

In the course of the present description, the invention shall be illustrated with particular reference to the manufacture of a belt structure of a tire. It is however hereby specified that the method and the apparatus according to the invention can be employed to manufacture a carcass structure of the tire or, more generally, any other reinforcing structure, comprising cords oriented in mutually parallel fashion and/or according to a pre-set angle relative to an equatorial plane of the tire.

2. Description of the Related Art

A tire for vehicle wheels normally comprises a carcass structure essentially composed by one or more carcass plies shaped according to a substantially toroidal configuration and presenting its axially opposite lateral edges engaged to respective annular reinforcing structures incorporating circumferentially inextensible inserts, usually called "bead rings". Each annular reinforcing structure is incorporated in a so-called "bead" defined along an inner circumferential edge of the tire for the anchoring thereof to a corresponding mounting rim.

On the carcass structure is applied, in radially external position, a belt structure comprising one or more belt layers shaped in a closed loop, essentially composed by textile or metal cords suitably oriented relative to each other and relative to the cords belonging to the adjacent carcass plies.

In a position radially external to the belt structure is also applied a tread band, normally constituted by a strip of elastomeric material of adequate thickness. It should be specified that, for the purposes of the present description, the term "elastomeric material" means the rubber compound in its entirety, i.e. the set formed by at least a polymeric base suitably amalgamated with reinforcing fillers and/or process additives of various kinds.

On the opposite sides of the tire is applied a pair of sidewalls each of which covers a lateral portion of the tire lying between a so-called shoulder area, located in proximity to the corresponding lateral edge of the tread band, and the corresponding bead.

In the manufacturing processes of less recent design, each belt layer is formed by joining sequentially a plurality of segments obtained by cutting to measure a continuous strip composed by a plurality of parallel longitudinal cords incorporated in an elastomeric layer. More in particular, the cutting and joining operations are performed in such a way as to obtain a so-called belt ring, wherein the cords of each segment are oriented according to a predetermined inclination relative to the circumferential development of the ring itself and parallel to the cords of the contiguous segments.

The completed belt ring, which can also comprise two or more layers formed in succession in radial superposition relationship, is associated in radially external position to the carcass structure, normally simultaneously with an operative step wherein the latter, initially obtained in the form of a cylindrical sleeve, is shaped according to a toroidal configuration.

Recently, particular attention has been dedicated to the search for manufacturing methods which would allow to eliminate or at least limit the manufacture of intermediate semi-finished products required for the manufacture of the tires. For instance, in the European patent application EP 97830731.2, in the name of the same Applicant, a method for manufacturing tires is described wherein the carcass ply or plies, as well as each of the belt layers, are obtained by laying, one after the other in circumferential approach relationship, a plurality of strip-like segments onto a toroidal support shaped according to the internal conformation of the tire to be obtained.

Document WO 99/17920 describes a method and an apparatus for manufacturing a belt layer by the laying of strip-like segments cut off from a continuous strip-like element. Each segment, once cut off from the continuous strip-like element, is drawn by means of magnetic or suction-cup gripping organs, commanded by one or more robot arms. The gripping organs hold the strip-like segment in correspondence with its opposite extremities, and possibly in correspondence with its central section, and are actuated upon command from the robot arms to cause the application of the segment itself onto the exterior surface of a toroidal support, according to a predetermined angle relative to the circumferential development thereof. Once the application is complete, the toroidal support is made to rotate about its own geometric axis according to a predetermined angle, to allow the application of a new strip-like segment adjacently to the one applied previously. The sequential repetition of the steps described above causes the formation of a belt layer extending according to the entire circumferential development of the toroidal support.

SUMMARY OF THE INVENTION

The Applicant has however noted that the laying of strip-like segments carried out according to the teachings of the prior art does not bring about a perfect structural homogeneity in the reinforcing structure obtained thereby.

In accordance with the present invention, it has been found that it is possible to guarantee a perfect structural homogeneity to a belt layer or other reinforcing structure obtained by means of the sequential laying of strip-like segments, if during the laying of each segment a relative rotation is brought about between the toroidal support and the segment itself, about an axis of correction that is substantially radial to the geometric axis of the toroidal support.

In particular, the subject of the present invention is a method for manufacturing a reinforcing structure for tires of vehicles, characterised in that during the application of each of said strip-like segments between the strip-like segment itself and the toroidal support, a relative angular rotation is caused about an axis of correction substantially radial to said geometric axis of rotation.

More specifically, the angular rotation about the axis of correction is advantageously obtained in a progressive manner during the application of the strip-like segment.

According to a preferential embodiment of the invention, it is also provided for the angular rotation about the axis of correction to be controlled in such a way as to bring about the application of the segment according to an orthodromic trajectory relative to the exterior surface of the toroidal support.

In particular, said relative angular rotation is preferably carried out by the actuating of the toroidal support, about an axis laying in an equatorial plane of the toroidal support.

Preferably, the axis of correction about which said angular rotation is carried out is situated in barycentric position relative to the strip-like segment that is about to be applied onto the toroidal support.

It is also advantageously provided for the preparation of said strip-like segments to be effected by means of cutting actions sequentially executed on at least a continuous strip-like element incorporating said filiform elements in said layer of elastomeric material.

Advantageously, each cutting action is followed by the application of the individual segment thus obtained onto the toroidal support.

It is also preferably provided for the individual strip-like segments to be sequentially positioned on the toroidal support according to a circumferential distribution pitch corresponding to the width of the strip-like segments themselves, measured in correspondence with an equatorial plane of the toroidal support.

According to a preferential embodiment of the present invention, the application of each strip-like segment comprises the following steps: laying the strip-like segment transversely relative to an equatorial plane of the toroidal support; radially approaching the strip-like segment to the toroidal support; rotating the toroidal support according to an angular pitch corresponding to the circumferential distribution pitch of the strip-like segments.

Preferably, a further step is carried out whereby each strip-like segment is pressed against the toroidal support, said pressing being initially carried out in proximity with a central portion of the respective strip-like segment and subsequently extended towards the opposite extremities of the strip-like segment itself.

In a preferential embodiment, the pressing step is carried out simultaneously with said approaching step.

If need be, it may be advantageously provided for the toroidal support to be constituted by a previously formed carcass structure.

In a preferential embodiment, however, at least one step is provided whereby a carcass structure is manufactured on the toroidal support, said step entailing the application onto the toroidal support being cared out by laying each strip-like segment directly onto said carcass structure.

The invention also relates to an apparatus for manufacturing a reinforcing structure for tires of vehicles, characterised in that it further comprises second angular actuation devices able to be activated during the application of each strip-like segment to cause, between the strip-like segment itself and the toroidal support, a relative angular rotation about an axis of correction that is substantially radial to said geometric axis of rotation.

Advantageously, the second angular actuation devices are operatively interpolated with said laying unit to cause the application of the segment according to an orthodromic trajectory relative to the exterior surface of the toroidal support.

Preferably, said second actuating devices are mechanically connected to said toroidal support to rotate the latter angularly about said axis of correction More in particular, said axis of correction lies substantially in an equatorial plane of the toroidal support.

In a preferential embodiment of the invention, said feeding unit comprises: a cutting organ operating on a continuous strip-like element to obtain therefrom said strip-like segments; a gripping organ movable between a first operative position wherein it engages a terminal end of said continuous strip-like element in proximity to the cutting organ, and a second operative position wherein it is removed from the cutting organ to extend the continuous strip-like element beyond the cutting organ itself, according to a segment whose length corresponds to that of the strip-like segment to be obtained.

Also in accordance with a preferential embodiment, said laying unit comprises at least a presser element movable in contrast relationship against the exterior surface of the toroidal support to cause the application of the strip-like segment.

More in detail, said laying unit comprises: at least two of said presser elements borne each by a respective support element, a guide structure bearing said support elements; radial actuation devices for translating the presser elements in radial approach to the exterior surface of the toroidal support; transverse actuation devices for translating the presser elements from a first operative condition wherein they are mutually approached to a second operative condition wherein they are removed relative to the equatorial plane of the toroidal support.

The presence may also be advantageously provided of auxiliary holding elements for holding the strip-like segment cut off by the action of said cutting organ.

Preferably, said auxiliary holding elements are movable relative to the presser elements in a direction substantially radial to the toroidal support.

BRIEF DESCRIPTION OF THE DRAWINGS

Further features and advantages shall become more readily apparent from the detailed description of a preferred, but not exclusive, embodiment of a method and an apparatus for manufacturing a reinforcing structure for tires of vehicles, according to the present invention. The description shall be made hereafter with reference to the accompanying drawings, provided solely by way of non limiting indication, in which.

DETAILED DESCRIPTION OF THE PREFERRED EMBODIMENTS

Figure 1:
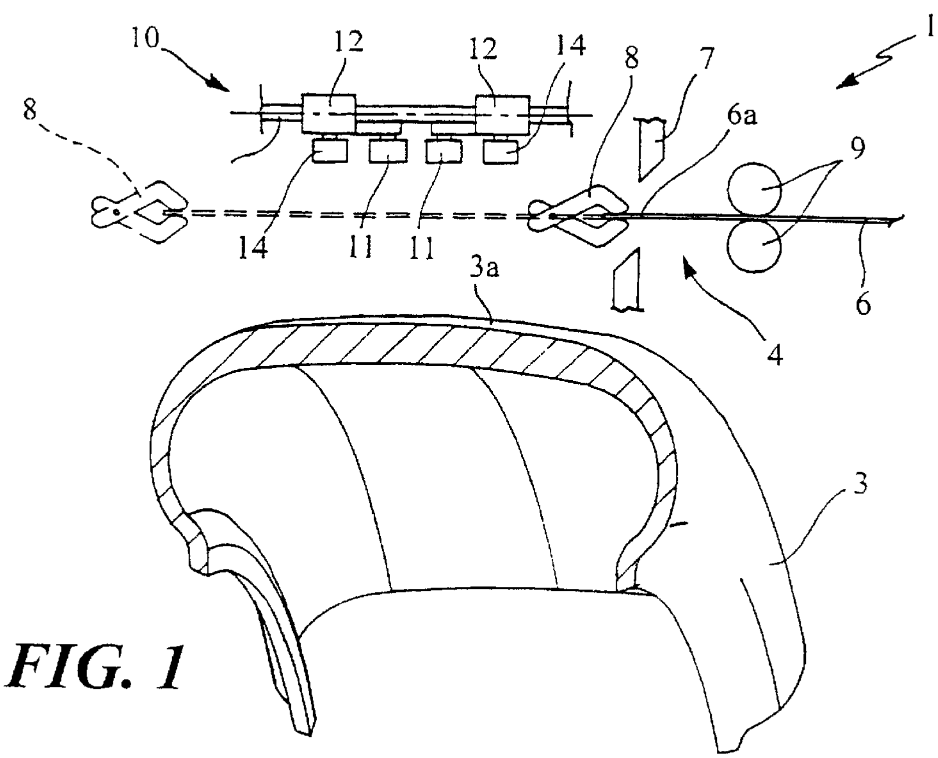
FIG. 1 schematically shows an apparatus according to the invention in an operative phase wherein an end of a continuous strip-like element is about to be gripped by a gripping element.

With reference to the aforementioned figures, and in particular to FIGS. 1 through 4, the number 1 indicates in its entirety an apparatus for manufacturing reinforcing structures for tires of vehicles, in accordance with a method according to the present invention.

In the embodiment described, the apparatus 1 is able to manufacture a belt structure 2 on a toroidal support 3 having an exterior surface 3*a* substantially shaped according to the interior surface of the tire to be obtained.

Preferably, before proceeding with the manufacture of the belt structure 2, onto the toroidal support 3 is applied a carcass structure (not shown in the drawings) that can be advantageously formed on the same toroidal structure 3 as described in any one of the patent applications EP 97830633.0, EP 97830731.2, EP 98830661.0, EP 98830472.1, all in the name of the same Applicant. The toroidal support 3, not described in detail since it can be obtained in any convenient manner by the person skilled in the art, can for instance be constituted by a metal drum able to be split up or collapsed to facilitate its subsequent removal from the tire thus obtained. The possibility is not excluded, however, of manufacturing the belt structure 2 directly on the carcass structure, appropriately stiffened for instance by means of inflating, which in this case would also serve the functions of toroidal support. It should also be specified that, if need be, the apparatus 1 as well as the method implemented thereby are suitable for being used also to manufacture the carcass structure itself, or otherwise any reinforcing structure of the tire.

The apparatus 1 comprises at least a feeding unit 4, able to provide, preferably one by one, strip-like segments 5 of predetermined length, obtained by means of cuing operations sequentially performed on at least a continuous strip-like element 6 coming from an extruding and/or calendering device, or from a feeding reel. The continuous strip-like element 6, and consequently the segments 5 obtained therefrom, presents each a plurality of cords or similar filiform elements made of metal or textile material, extending in mutual parallel fashion along the longitudinal development of the strip-like element and of the segment itself, and at least partially coated by a layer of elastomeric material applied by means of an extruding and/or calendering operation.

Figure 2:
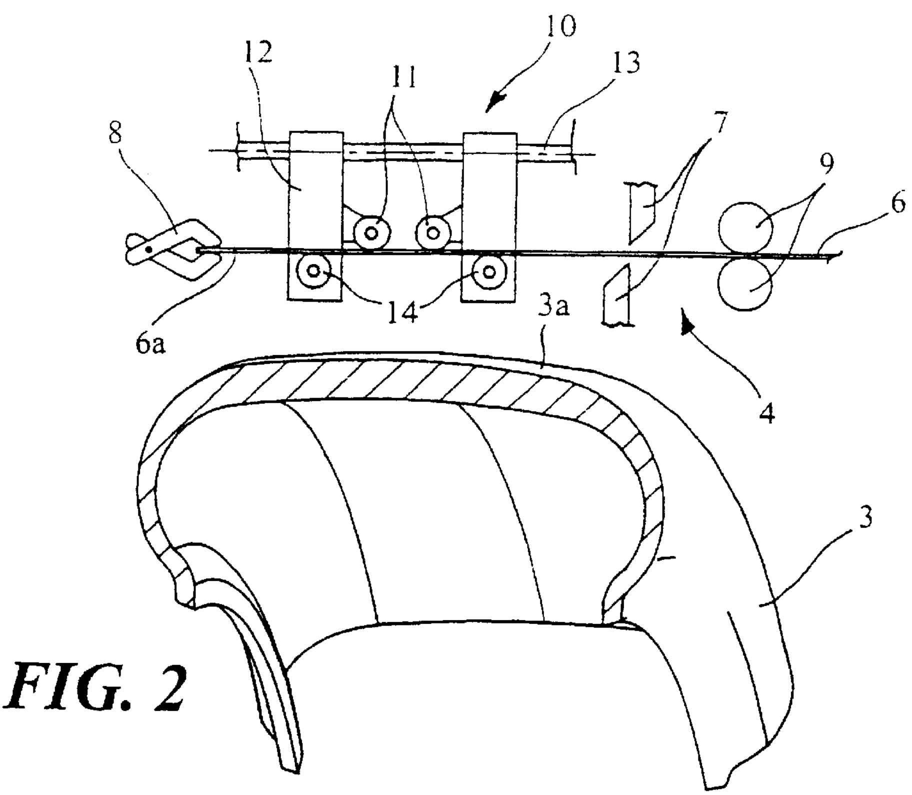
FIG. 2 shows a phase subsequent to FIG. 1, wherein the strip-like element has been extended next to the toroidal support to be engaged by the laying unit.

The feeding unit 4 comprises at least a cutting organ 7 able to cut the continuous strip-like element 6 perpendicularly or according to a predetermined inclination relative to the longitudinal development thereof, to obtain the individual strip-like segments 5. To the cutting organ 7 is combined at least a gripping organ 8 movable between a first working position wherein, as per FIG. 1, it is able to engage a terminal end 6*a* of the continuous strip-like element 6 in proximity with the cutting organ 7, and a second working position wherein it is removed from the cutting organ itself. As shown in FIG. 2, following the translation from the first to the second working position, the gripping organ 8 drives the continuous strip-like element 6 in such a way as to extend it beyond the cutting organ 7 and preferably in radially approach position relative to the toroidal support 3, according to a segment whose length corresponds to that of the segment 5 to be obtained following the successive actuation of the cutting organ itself. In the accompanying figures, the number 9 indicates a pair of guide rollers operating on the continuous strip-like element 6 in an area immediately upstream of the cutting organ 7.

Figure 5:
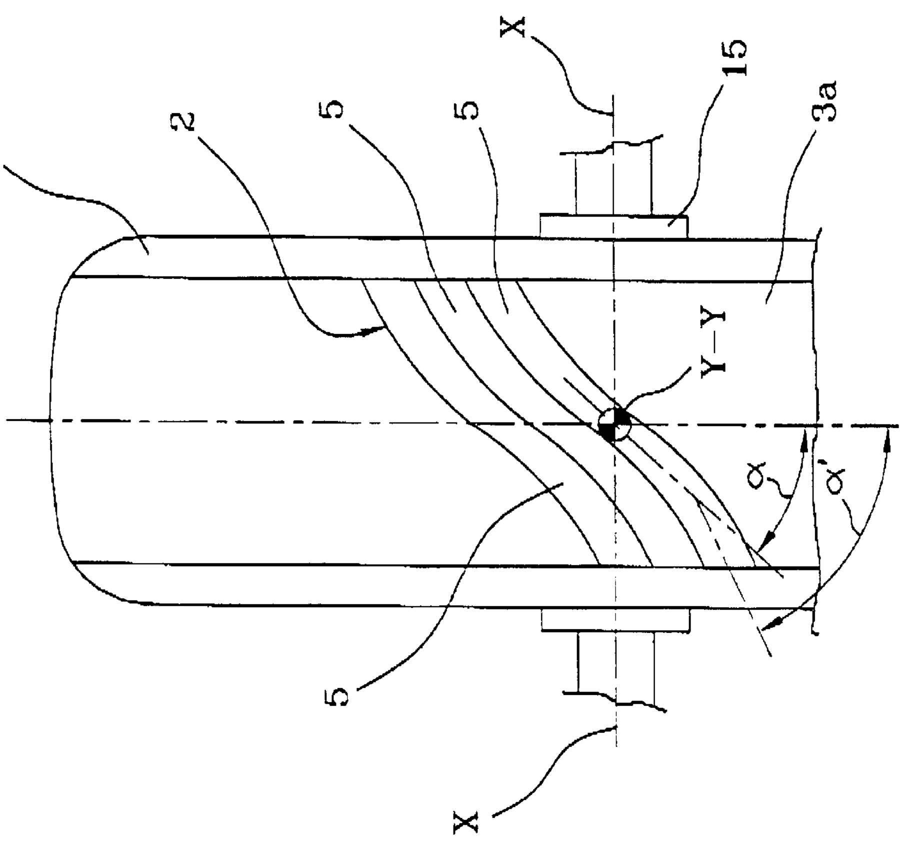
FIG. 5 shows a diagram of the laying of the strip-like segments carried out according to the present invention.

The apparatus 1 further comprises at least a laying unit 10 that is able to sequentially engage each of the strip-like segments 5 prepared in the manner described above, to cause the application onto the exterior surface 3*a* of the toroidal support 3, or onto the carcass structure formed thereon, according to a pre-set laying angle relative to a direction of circumferential development of the toroidal support itself (FIG. 5).

The laying angle α can be easily pre-set by appropriately orienting the laying unit 10, and possibly the feeding unit 4, relative to the toroidal support 3, or by suitably orienting the latter relative to the same laying unit 10 and feeding unit 4. For purposes of manufacturing the belt structure 2, the laying angle α, measured at least in correspondence with an equatorial plane of the toroidal support 3, can range, by way of indication, between 20° and 35°.

Preferably, the laying unit 10 comprises at least a presser element 11 movable along the strip-like segment 5, in contrast relationship against the exterior surface 3*a* of the toroidal support 3. More specifically, in a preferential embodiment the use is provided of at least two presser elements 11, each borne by a support element 12 movable alone a guide structure 13 upon the action of transverse actuation devices, for instance of the worm screw type, not shown herein since they can be manufactured in any manner suitable to the person skilled in the art.

To each support element 12 is also preferably engaged at least an auxiliary holding element 14 which is able to co-operate with the respective presser element 11 to hold the strip-like element 5 in the instants elapsing between its cutting off by the action of the cutting unit 7 and its application onto the toroidal support 3. More in detail, each auxiliary holding element 14 can for instance be constituted by a roller projecting from the respective support element 12 in such a way as to provide a bearing seat for the elongated element 6 driven by the gripping organ 8 and for the cut-off strip-like element 5. In order to favour a translation of the gripping organ 8 between the first and the second operative position in the absence of mechanical interference, it can also be provided for the support elements 12 to be able to rotate angularly about a longitudinal axis of development of the guide structure 13, so as to translate the respective presser elements 11 and auxiliary holding elements 14 between a resting position wherein, as FIG. 1 shows, they are removed relative to a longitudinal actuation trajectory imposed to the continuous elongated element 6 by the gripping organ 8, and a working position wherein, as FIG. 2 shows, they are positioned on said actuation trajectory and act in engagement relationship with the elongated element itself.

To the laying unit 10 are also associated radial actuation devices able to translate the presser elements 11 in radial approach to the exterior surface 3*a* of the toroidal support 3. Such radial actuation devices are not illustrated or described in detail, since they can be obtained in any manner convenient to the person skilled in the art, and can for example operate on the guide structure 13 and/or directly on the presser elements 11, in order to bring the strip-like segment 5 in contact relationship on the exterior surface 3*a* of the toroidal support 3. It is further preferably provided for the auxiliary holding elements 14 to be movable relative to the presser elements 11 in a direction substantially radial to the toroidal support 3. In this way, the presser elements 11 can bring the strip-like segment 5 in contact on the exterior surface 3*a* without causing mechanical interference between the toroidal support 3 and the auxiliary holding elements 14. In the illustrated embodiment, the relative motion described above is obtained by directly translating the presser elements 11 along the blocks 12, in the direction of the toroidal support 3.

Figure 3:
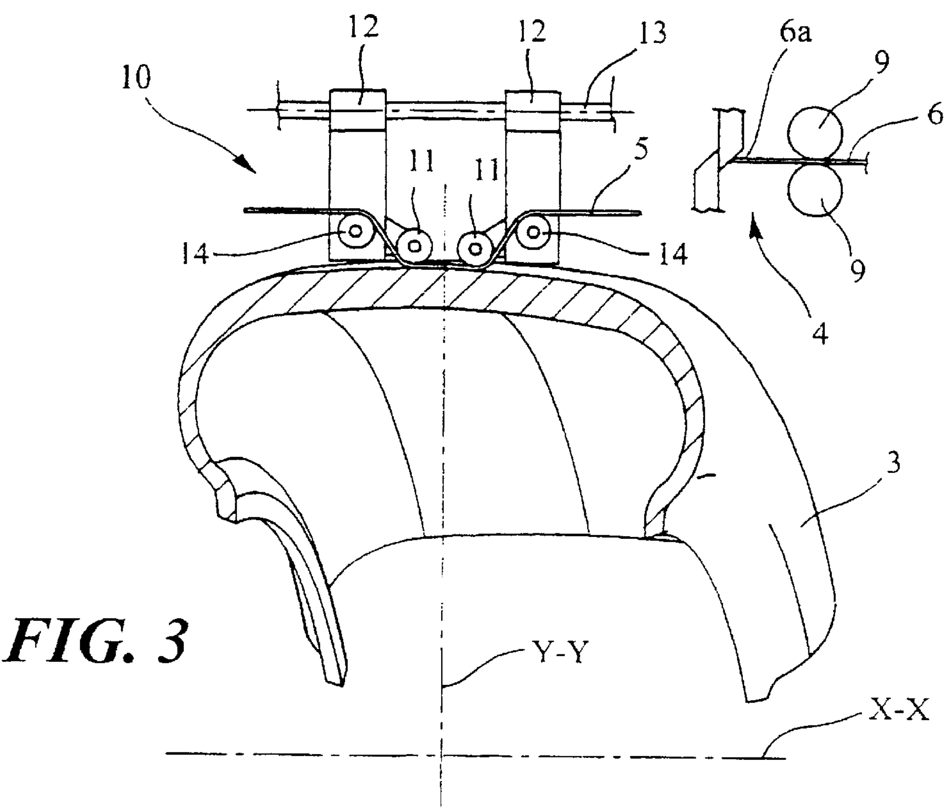
FIG. 3 shows a phase subsequent to FIG. 2, wherein the strip-like segment is about to be applied in correspondence with its central portion onto the toroidal support.
Figure 4:
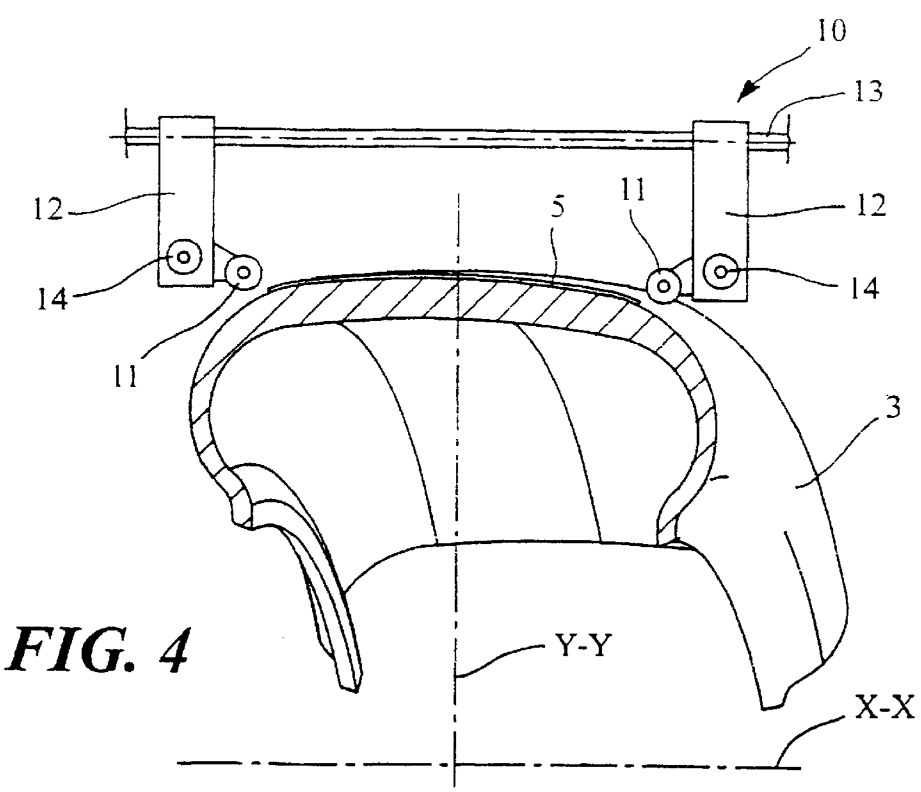
FIG. 4 shows a final phase of the application of the strip-like segment.

Further provided are transversal actuation devices, also not shown since they can be obtained in any convenient manner, operating for instance between the guide structure 13 and the blocks 12 to translate the pressure elements 11 between a first operative condition wherein, as shown in FIG. 3, they are mutually approached and a second operative condition wherein, as shown in FIG. 4, they are removed relative to an equatorial plane of the toroidal support 3.

The preparation and laying of each strip-like segment 5 are carried out in the following manner.

Starting from the condition illustrated in FIG. 1, the gripping organ 8 is brought to the first working condition to engage the terminal end 6*a* of the continuous strip-like element engaged between the guide rollers 9 in proximity to the cutting organ 7 (FIG. 1). When the gripping organ 8 arrives in proximity to the second working position, the angular rotation of the support elements 12 is determined about the direction of longitudinal development of the guide structure 13, in such a way as to bring the auxiliary holding elements 14 in engagement relationship below the continuous strip-like element 6, driven by the gripping organ itself (FIG. 2).

The intervention is then commanded of the cutting organ 7, which cuts the strip-like segment 5. In this circumstance, the auxiliary holding elements 14 hold the strip-like segment 5, transversely laid in a position substantially centered relative to the equatorial plane of the toroidal support 3.

The translation of the presser elements 11 towards the toroidal support 3 is also brought about, so that the strip-like element 5 is radially approached to the toroidal support 3 and brought in contact and pressed with its central portion against the exterior surface 3*a*, in proximity to the equatorial plane of the toroidal support itself. With the motion of the support elements 12 away from each other along the guide support 13, the simultaneous translation is determined of the presser elements 11 along the strip-like segment 5, away from the equatorial plane, so as to cause the application of the segment itself according to its entire length onto the toroidal support 3, with a pressing action progressively extending towards the opposite extremities of the strip-like segment itself, starting from the central portion thereof.

Subsequently, by action of first angular actuation devices, an angular rotation of the toroidal support 3 is determined about its own geometric axis X—X according to a predetermined angular pitch, to ready it for the application of a new strip-like segment 5. The sequential repetition of the operations described above determines the formation of the belt 2, composed of at least a layer having continuous circumferential development about the geometric axis of rotation X—X, formed by a plurality of strip-like segments 5 distributed in mutually approached relationship along the circumferential development of the toroidal support 3.

Purely by way of example, the first angular actuation devices can for instance comprise a stepping motor or another type of actuator operating on a hub 15 coaxially associated to the toroidal support 3. Alternatively, said first angular actuation devices can assume any other embodiment that is convenient to the person skilled in the art, suitable to bring about a relative motion between the laying unit 10 and the toroidal support 3, about the geometric axis X—X.

Preferably, the aforesaid relative motion about the geometric axis X—X is controlled in such a way that the laying of the strip-like segments 5 occurs according to a circumferential distribution pitch corresponding to the width of the strip-like segments themselves, measured in correspondence with the equatorial plane of the toroidal support 3.

Alternatively, the laying of the strip-like segments 5 can be carried out according to a circumferential distribution pitch corresponding to a multiple of the width specified above, in such a way as to determine the formation of the continuous layer after two or more complete revolutions of the toroidal support 3 about the geometric axis X—X.

In accordance with the present invention the Applicant has however observed that, in the absence of additional expedients which shall be described hereafter, the laying of the strip-like segments 5 could not take place in an optimal manner. It should be noted, in fact, that the laying unit 10 tends to apply each strip-like segment 5 according to a rectilinear and loxodromic trajectory, i.e. one that intersects the meridian planes of the toroidal support 3 according to a constant angle, corresponding to the theoretical angle $\alpha$, pre-set by adjusting the mutual orientation between the guide structure 13 and the geometric axis of rotation X—X of the toroidal support 3.

The Applicant has observed that, in this circumstance, the superficial curvature presented by the toroidal support 3 would make it impossible to obtain a perfect mutual approach of the strip-like segments 5 laid thereon. It should be noted, in this regard, that the exterior surface 3*a* presents a first curvature about the geometric axis X—X as well as a second curvature present in the case wherein, as in the example described and illustrated, a convex toroidal support 3 is used, presenting a curvilinear cross section profile.

The curvature presented by the exterior surface 3*a* about the geometric axis X—X determines a first factor interfering with the correct laying of segments. Even considering the case of a non-convex toroidal support, with the exterior surface 3*a* cylindrically shaped, the superficial curvature about the axis X—X forces each strip-like segment 5, once applied, to take on a helical development.

Consequently, in order to assure a correct application of the strip-like segment 5, the presser elements 11 should translate according to curvilinear trajectories, arranged to form a substantially "S" shaped laying line, corresponding to the projection of the helical development of the segment 5 in a plane tangential to the exterior surface 3*a*.

In a preferential embodiment of the invention, to the advantage of the constructive simplicity and flexibility of use, the laying unit 10 instead tends to lay the strip-like segment 5 according to a rectilinear trajectory, in the direction of sliding of the support elements 12 along the guide structure 13. Consequently, the segment 5 would tend to be laid in an imperfect manner, with a certain deviation with respect to the helical development that it should assume. More specifically, as the opposite extremities of the strip-like segment 5 are approached, the laying angle α would tend to undergo a progressive reduction, whose size varies according to the outer diameter of the toroidal support 3, to the initial value of the laying angle α, and to the axial dimension of the belt layer formed on the toroidal support itself.

An additional factor interfering with the correct laying of the segments derives from the curvature in the axial direction determined on the exterior surface 3*a* due to the curvilinear profile caused by the convexity of the toroidal support 3.

It should be noted that, due to the curvilinear profile specified above, a slight variation of the radius of the toroidal support 3 is brought about, measurable, with reference to its axis of rotation X—X, in different points of a superficial area delimited between the opposite extremities of each strip-like segment 5. In the final analysis, in the superficial area involved with each strip-like segment a maximum radius can be identified in correspondence with the equatorial plane of the drum 3, and a minimum radius can be identified in correspondence with each of the meridian planes passing through the opposite extremities of the strip-like segment itself.

The consequent variation of the circumferential development of the toroidal support 3 in its different meridian planes would, in itself, already be incompatible with a correct application of the strip-like segments 5 which, presenting constant width, should partially overlap one another to a progressively larger extent towards their central areas, to compensate for the variation in circumferential development.

It has further been observed that the progressive variation in the value of the radius from maximum radius to minimum radius would cause, in the course of the application of each strip-like segment 5, a further deviation of the inclination thereof relative to the theoretical angle α, which would be added to the deviation determined by the curvature of the exterior surface 3*a* about the geometric axis X—X.

As a consequence, in correspondence with its opposite extremities, each strip-like segment 5 would tend to assume a deviated angle β (FIG. 6) having a lesser value than that of the theoretical angle α.

Figure 6:
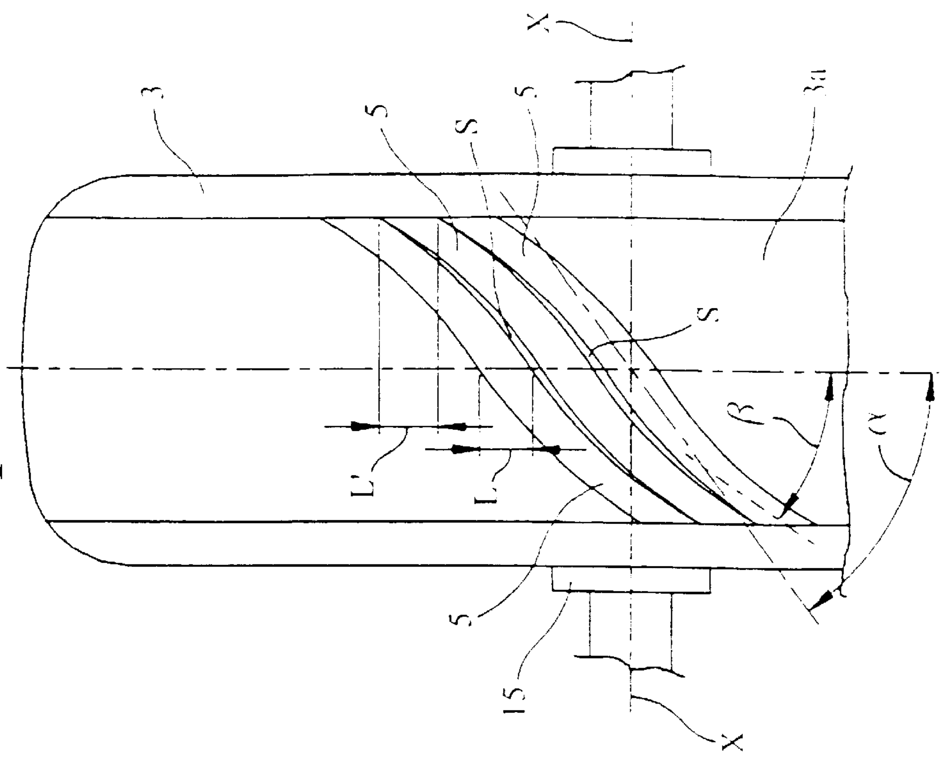
FIG. 6 shows a diagram of the laying of the strip-like segments carried out according to the teaching of the prior art.

Since the width of each strip-like segment 5 is constant, the variation of its inclination from the theoretical value α to the deviated value β would also being about an increase in the circumferential amplitude of the segment itself, measurable along meridian lines positioned in correspondence with the opposite extremities of the segment 5, with respect to the circumferential amplitude measurable along an equatorial line of the drum 3. In FIG. 6, the dimensions relating to the circumferential amplitude along the equatorial line and along the meridian lines specified above are indicated respectively as L and L'.

It would consequently be impossible to make each longitudinal edge of each segment 5 match with the longitudinal edge of the adjacent segment 5, according to the entire longitudinal extension of the edges themselves. If the edges of the segments 5 were made to match in correspondence with the equatorial plane, a partial superposition of the segments themselves would be determined, progressively larger in the direction of the opposite extremities of each of them. If, vice versa, the angular rotation pitch of the toroidal support 3 were regulated in such a way as to make the extremities of the segments 5 match, an empty space S would be obtained between contiguous segments in correspondence with the equatorial plane, as is clearly shown in schematic fashion in FIG. 6, which represents the laying obtainable, in the circumstances specified above, according to the teachings of the prior art. In this figure, the empty space S has been purposely enlarged, for the sake of better representational clarity.

The Applicant has brilliantly tackled and solved the problems described above by associating to the apparatus 1 second angular actuation devices, able to be activated during the application of each strip-like segment 5 to cause a relative angular rotation between the segment itself and the toroidal support 3, about an axis of correction Y—Y substantially radial to the geometric axis of rotation X—X. These second angular actuation devices are not shown or further described in that they can also be obtained in any convenient manner by the person skilled in the art, for instance with the aid of servomotors controlled by a programmable electronic control unit, which oversees the operation of the entire apparatus 1 according to a pre-set work program.

It is preferably provided for the second angular actuation devices to be mechanically connected to the toroidal support 8, to rotate the latter angularly about the axis of correction Y—Y. However, the possibility should not be excluded of associating the second angular actuation devices to the laying unit 10 to obtain the relative angular rotation described above by the actuation of the laying unit itself.

Preferably, the axis of correction Y—Y lies in the equatorial plane of the toroidal support 3, and still more preferably is located in a barycentric position relative to the segment 5 which is about to be laid, as FIG. 5 clearly shows.

Advantageously, the second actuation devices are operatively interpolated with the laying unit 10, and more specifically with the transverse actuation devices which cause the controlled displacements of the blocks 12 along the guide structure 13.

More specifically, the activation of the second actuation devices is controlled as a function of the position progressively assumed by the support elements 12 along the guide structure 13 during the application of the strip-like segment 5.

In this way, the correction of the laying angle is advantageously carried out in a progressive manner in the course of the application of the strip-like segment 5, so that to each point of the longitudinal development of the segment 5 corresponds a specific value of correction of the laying angle.

The amplitude of the angular rotation to be imparted to the toroidal support 3 shall be computed on each occasion according to the geometric and dimensional characteristics of the toroidal support 3 and of the strip-like elements 5 laid thereon.

More specifically, the amplitude of the angular rotation to be carried out in order to compensate for the curvature of the exterior surface 3*a* about the geometric axis X—X shall be higher, the lower the values of the theoretical laying angle α and of the outer diameter of the toroidal support 3 will be, and the higher the axial dimension of the belt layer formed by the laid strip-like segments 5 will be.

The amplitude of the angular rotation to be effected in order to compensate for the curvature of the transverse profile is in turn correlated, not only to the parameters specified above, but also to the difference measurable between the aforesaid maximum radius and minimum radius and to the geometric shape of the transverse profile itself. More specifically, the greater the difference between the maximum radius and the minimum radius of the toroidal support 3, the greater the difference between the amplitude of the angular rotation effected about the axis of correction Y—Y. It is thereby possible to give each segment 5 a progressively decreasing circumferential amplitude until reaching a position in correspondence with its own extremities, so as to assure a perfect homogeneity in the distribution of the strip-like segments 5, and more specifically of the cords present therein, along the entire circumferential development of the toroidal support 3.

In each meridian plane of the toroidal support 3, the circumferential amplitude of each segment 5 will have a value which, multiplied times the number of segments laid to complete the belt layer, yields a result corresponding to the circumferential development measurable on the toroidal support 3 in the meridian plane in question.

It should also be observed that the execution of the cutting operation of the continuous strip-like element 6 by the cutting organ 7 can advantageously take place according to a direction that forms, with the longitudinal development of the strip-like segment itself, a cutting angle whose value corresponds to a correct laying angle $\alpha'$, presented by the segment 5 in correspondence with its own extremities as a result of the expedients adopted as previously described in the course of the laying operation.

It is thereby possible to confer a continuous development to the lateral edges of the belt structure 2 formed on the toroidal support 3. It is however also possible to determine the execution of the cutting operation according to a different angle from the one specified above, for instance according to a direction perpendicular to the longitudinal development of the continuous strip-like element 6.

By way of example, the values are set out here which relate to the construction of the belt layer, comprising a pair of belt layers with crossed cords, in a prototype tire size 225/50 R 16.

The segments 5 used were cut off a continuous tape (band) of rubberised tissue 21 comprising reinforcing cords each constituted by a strand of wires made of high-carbon steel (>0.8% carbon content), with 2–1×0.28 HT conformation.

The manufacturing drum, already covered with the carcass ply, presented an outer diameter, in correspondence with the equatorial plane, of 590 mm.

For purposes of manufacturing the inner belt layer, each segment, 25 mm wide, 420 mm long and 1.2 mm thick, was laid onto the drum with an angle $\alpha$ of 27° relative to the circumferential direction, in correspondence with the aforesaid equatorial plane. Each segment was then pressed onto the surface of the drum proceeding in the axial direction towards both extremities, progressively varying the laying angle so as to reach, in correspondence with the aforesaid extremities, an angle equal to 30.4°, i.e. 30° and 15'. In substantially identical fashion, the second belt layer was constructed, radially superposed to the first layer: in particular, the segments of said second layer had a length of 402 mm and were positioned with the reinforcing cords symmetrically crossed with those of said first layer. Said pair of layers was then covered with a spiralled winding of nylon cords, oriented circumferentially.

The subsequent radiographic examination of the belt layer confirmed the perfect homogeneity of thickness of the metal cords along the circumferential development of the manufacturing drum, both in correspondence with the equatorial plane, and in correspondence with each meridian plane, parallel to the equatorial plane and axially positioned at both sides of said equatorial plane: in particular, said examination has shown the achievement of a perfect homogeneity of thickness also between the side-by-side cords of two adjacent segments, i.e. a result never obtained with the usual belt manufacturing systems known in the art.

The present invention achieves important advantages.

The subject method and apparatus allow to form a belt structure or other type of reinforcing structure by laying strip-like segments, assuring a perfect structural homogeneity, particularly in terms of thickness of the cords along the circumferential development of the toroidal support 3, both when a substantially cylindrical toroidal support is employed, and when the toroidal support in use presents a curvilinear cross section profile in the area involved with the laying of the segments.

What is claimed is:

1. A method for manufacturing a reinforcing structure for tyres of vehicles, comprising the steps of:

- preparing a plurality of strip segments each comprising substantially parallel, longitudinal filiform elements at least partially coated by at least one layer of elastomeric material; and
- applying the plurality of strip segments along a circumference of a toroidal support, to form at least one continuous reinforcing layer about a geometric axis of rotation of the toroidal support;
- wherein the applying step includes bringing a central portion of each strip segment in contact against the toroidal support, and
- wherein during the applying step, a relative angular rotation about an axis of correction substantially radial to the geometric axis of rotation occurs between the toroidal support and each strip segment after the central portion of each strip segment has been brought in contact against the toroidal support.

2. The method of claim 1, wherein the relative angular rotation about the axis of correction occurs in a progressive manner during the applying step.

3. The method of claim 1, wherein the relative angular rotation about the axis of correction is controlled during the applying step to cause the plurality of strip segments to be applied according to an orthodromic trajectory with respect to an exterior surface of the toroidal support.

4. The method of claim 1, wherein the relative angular rotation is obtained by actuating the toroidal support.

5. The method of claim 1, wherein the axis of correction about which the relative angular rotation occurs lies in an equatorial plane of the toroidal support.

6. The method of claim 1, wherein the axis of correction about which the relative angular rotation occurs is located in a barycentric position relative to the at least one of the plurality of strip segments.

7. The method of claim 1, wherein the preparing step comprises a plurality of cutting actions sequentially executed on at least one continuous strip element to produce strip segments incorporating the filiform elements in the at least one layer of elastomeric material.

8. The method of claim 7, wherein each of the plurality of cutting actions is followed by applying a corresponding strip segment along a circumference of the toroidal support.

9. The method of claim 1, wherein the plurality of strip segments are sequentially positioned on the toroidal support according to a circumferential distribution pitch corresponding to a width of the strip segments, measured in correspondence with an equatorial plane of the toroidal support.

10. The method of claim 1, wherein the applying step for each strip segment comprises:

laying the strip segment transversely relative to an equatorial plane of the toroidal support;

moving the strip segment radially with respect to the toroidal support; and rotating the toroidal support according to an angular pitch corresponding to a circumferential distribution pitch of the strip segment.

11. The method of claim 10, further comprising the step of:

pressing the strip segment against the toroidal support, wherein the pressing is initially carried out in proximity to the central portion of the strip segment, wherein the strip segment comprises a first end and a second end, and wherein the pressing is subsequently extended towards the first end and the second end of the strip segment.

12. The method of claim 11, wherein the pressing step is carried out simultaneously with the moving step.

13. The method of claim 1, wherein the toroidal support comprises a previously formed carcass structure.

14. The method of claim 1, further comprising the step of:

manufacturing a carcass structure on the toroidal support, wherein the applying step comprises laying each of the strip segments onto the carcass structure.

* * * * *

UNITED STATES PATENT AND TRADEMARK OFFICE
CERTIFICATE OF CORRECTION

PATENT NO. : 6,702,913 B2
DATED : March 9, 2004
INVENTOR(S) : Marchini et al.

It is certified that error appears in the above-identified patent and that said Letters Patent is hereby corrected as shown below:

Title page,
Item [75], Inventors, "Maurizio Marchini, Milan (IT);" should read -- Maurizio Marchini, Seregno (IT); --; "Marco Cantu, Milan (IT);" should read -- Marco Cantu', Carnate (IT) --; and "Ignazio De Gese, Milan (IT);" should read -- Ignazio De Gese, Sesto San Giovanni (IT) --.

Signed and Sealed this

Fifth Day of April, 2005

JON W. DUDAS
*Director of the United States Patent and Trademark Office*